US008622792B1

(12) United States Patent
Murray

(10) Patent No.: US 8,622,792 B1
(45) Date of Patent: Jan. 7, 2014

(54) RACK AND PINION SIEVE ADJUSTMENT MECHANISM

(71) Applicant: CNH America LLC, New Holland, PA (US)

(72) Inventor: Craig Elwyn Murray, Davenport, IA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/684,959

(22) Filed: Nov. 26, 2012

(51) Int. Cl.
*A01F 12/32* (2006.01)
*B07B 1/00* (2006.01)

(52) U.S. Cl.
USPC .......................................................... 460/101

(58) Field of Classification Search
USPC ................. 460/101, 8, 6, 42, 109, 5; 209/394
See application file for complete search history.

(56) References Cited

U.S. PATENT DOCUMENTS

| 735,016 | A | | 7/1903 | Ditch et al. | |
|---|---|---|---|---|---|
| 1,383,918 | A | | 7/1921 | Fadness | |
| 2,253,296 | A | * | 8/1941 | Holtzman | 209/394 |
| 4,409,780 | A | * | 10/1983 | Beougher et al. | 56/228 |
| 4,712,568 | A | * | 12/1987 | Strong et al. | 460/69 |
| 5,833,414 | A | * | 11/1998 | Feldman et al. | 410/151 |
| 5,984,777 | A | * | 11/1999 | Kuchar | 460/101 |
| 6,035,579 | A | * | 3/2000 | Staser et al. | 49/351 |
| 6,468,154 | B1 | * | 10/2002 | Eggenhaus et al. | 460/101 |
| 6,579,172 | B2 | * | 6/2003 | Lauer | 460/101 |
| 6,585,584 | B2 | | 7/2003 | Buermann | |
| 6,632,136 | B2 | * | 10/2003 | Anderson et al. | 460/101 |
| 6,890,253 | B2 | | 5/2005 | Mammen et al. | |
| 6,953,397 | B2 | * | 10/2005 | Jonckheere et al. | 460/42 |
| 7,029,392 | B2 | * | 4/2006 | Jonckheere et al. | 460/42 |
| 7,371,162 | B2 | | 5/2008 | Matousek et al. | |
| 7,927,199 | B2 | | 4/2011 | Adamson et al. | |
| 2002/0006816 | A1 | * | 1/2002 | Buermann | 460/42 |
| 2003/0130019 | A1 | * | 7/2003 | Mammen et al. | 460/101 |
| 2008/0004092 | A1 | | 1/2008 | Nelson et al. | |

FOREIGN PATENT DOCUMENTS

| DE | 19824462 A1 * 12/1999 | A01F 12/44 |
|---|---|---|
| JP | 4183321 6/1992 | |

* cited by examiner

*Primary Examiner* — Árpád Fábián-Kovács
(74) *Attorney, Agent, or Firm* — Patrick M. Sheldrake; Seyed V. Sharifi

(57) ABSTRACT

A sieve adjustment mechanism including a rack gear, a pivot handle, and an actuator, to mitigate lost motion/play in pivot link sieve assembly. The rack gear is movable between a first and a second position and connectable to a first sieve segment for moving the first sieve segment between a first sieve position and a second sieve position. The pivot handle includes a pinion gear at a first end of the pivot handle for operatively engaging the rack gear for moving the rack gear between the first and second positions and a second end opposite the first end. The pinion gear is rotatable about a first axis. The actuator is connected to the second end of the pivot handle for pivoting the pivot handle about the first axis to move the rack gear between the first and second positions.

20 Claims, 6 Drawing Sheets

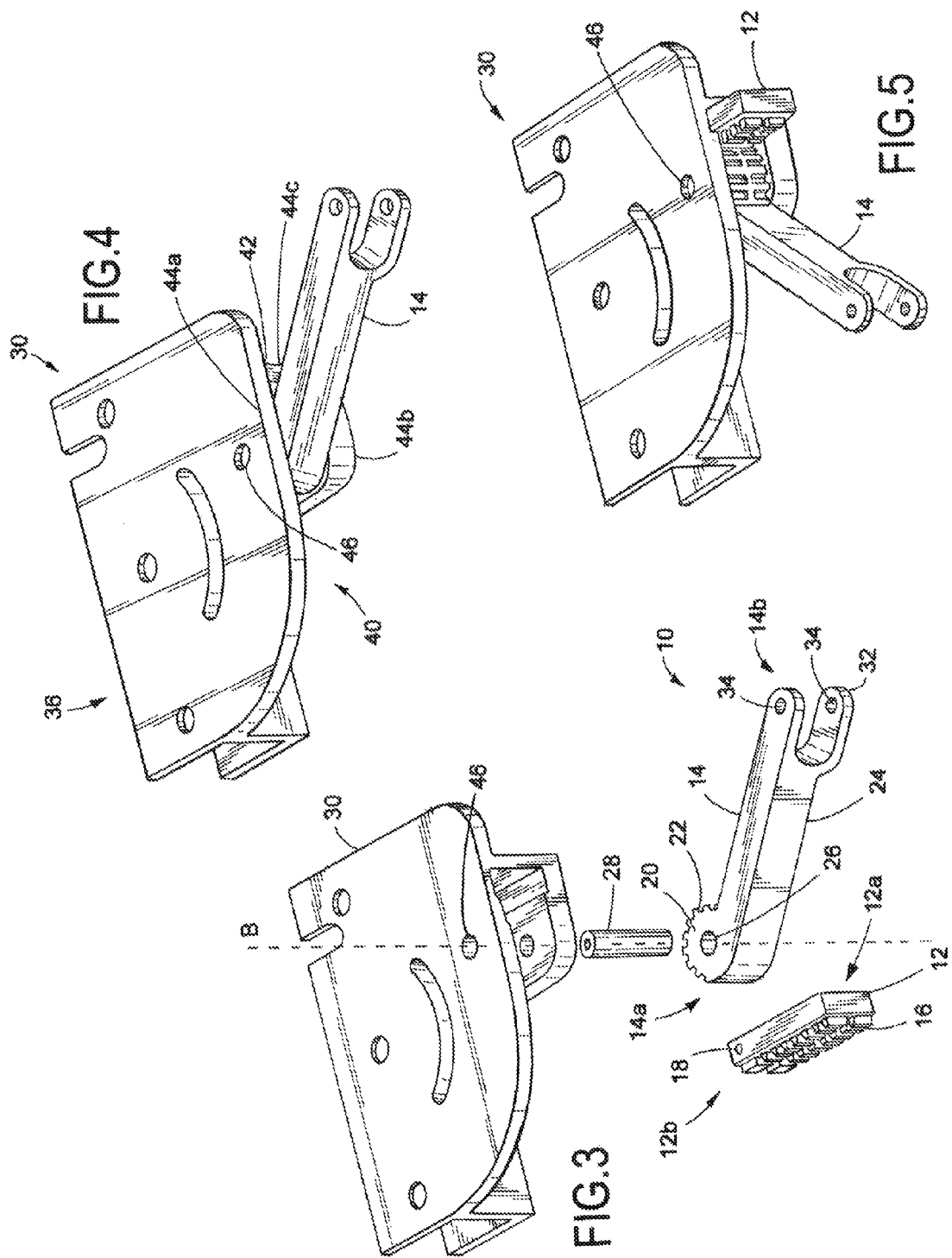

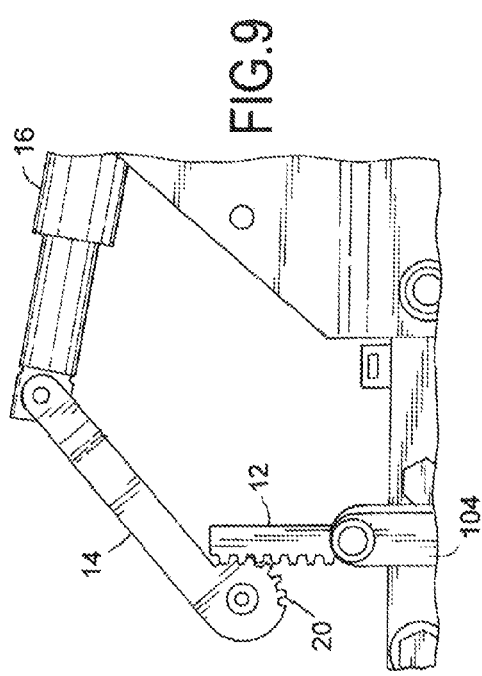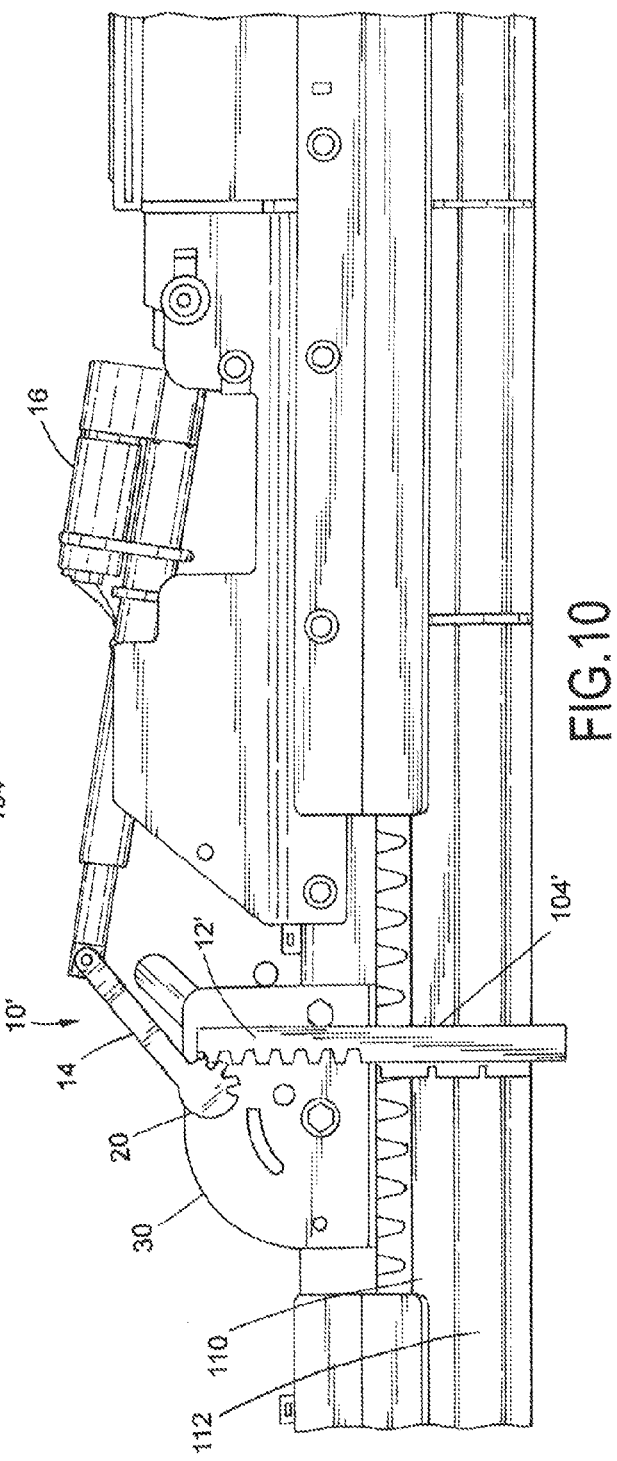

RACK AND PINION SIEVE ADJUSTMENT MECHANISM

BACKGROUND OF THE INVENTION

The present invention generally relates to a sieve adjust mechanism and more particularly to a rack and pinion sieve adjustment mechanism applicable to agricultural combines.

In an agricultural harvester combine, the grain is harvested, threshed and cleaned. In conventional agricultural combines, the stocks of grain flow on a conveyer from the harvester to a threshing drum where the grain is loosened from the stock. The grain is then cleaned by passing it through a cleaning assembly.

In most combines, the cleaning assembly contains three main components: a blower, an upper sieve and a lower sieve. The blower has its own housing, whereas the upper sieve and lower sieve are mounted on a cleaning shoe. The sieve consists of a large number of louvers or slats which, based on the crop conditions, need to be opened or closed to control the separating characteristics. Grain is cleaned and separated by passing the grain through the sieves of the cleaning assembly.

FIG. 1 illustrates a conventional sieve adjustment mechanism 100 used in the industry consisting of pivoting handles or lever arms 102 which push or pull the louvers or slats through arm 104 to adjust the size of the sieve opening. However, a problem associated with conventional sieve adjustment mechanisms is that there is generally a significant amount of lost motion or play in the pivot joints of handle 102 and arm 104. The lost motion of conventional sieve adjustments arises from the mechanisms used to adjust the positioning of sieve slats or louvers. Such conventional sieve adjustment mechanisms rely on linkages rotating about fixed pivot points, e.g., 106, as a result there is not a true translation in a single direction of motion so the slats or louvers open or close at different rates during a range of motion of the handles 102. As a result, when a sieve is remotely adjusted using e.g., in-cab electronics, this lost motion/play cannot be easily accounted for and results in less than optimal slat openings or slat openings differing from that set or anticipated by the user.

Thus, there is a need for a system and apparatus for a sieve adjustment mechanism that addresses the aforementioned deficiencies of conventional sieve adjustment mechanisms. Such needs are met by the sieve adjustment mechanism of the present invention.

BRIEF SUMMARY OF THE INVENTION

In accordance with a first aspect, the present invention provides a sieve adjustment mechanism that includes a rack gear, a pivot handle and an actuator. The rack gear is movable between a first and a second position and connectable to a sieve segment of a sieve for moving the sieve segment between a first sieve position and a second sieve position. The pivot handle includes a pinion gear at a first end of the pivot handle for operatively engaging the rack gear for moving the rack gear between the first and second positions and a second end opposite the first end. The pinion gear is rotatable about a first axis. The actuator is connected to the second end of the pivot handle for pivoting the pivot handle about the first axis to move the rack gear between the first and second positions.

In accordance with a second aspect, the present invention provides a cleaning system for an agricultural combine that includes a sieve and a sieve adjustment mechanism. The sieve includes a first sieve segment disposed adjacent a second sieve segment in an end to end relation. The sieve adjustment mechanism is operatively connected to at least one of the first and second sieve segments for moving at least one of the first and second sieve segments relative to the other to adjust the size of a sieve opening of the sieve. The sieve adjustment mechanism includes a rack and pinion gear mechanism for linearly moving at least one of the first and second sieve segments relative to the other. The rack and pinion gear mechanism includes a pinion gear integrally formed with an elongated handle.

In accordance with a third aspect, the present invention provides a sieve assembly that includes a sieve, an arm and a sieve adjustment mechanism. The sieve includes a first sieve segment disposed adjacent a second sieve segment. The arm extends between and is operatively connected to the first and second sieve segments. The arm includes a rack gear integrally formed at an end of the arm. The sieve adjustment mechanism is operatively connected to the arm for moving at least one of the first and second sieve segments relative to the other to adjust the size of a sieve opening of the sieve. The sieve adjustment mechanism includes a pinion gear operatively engaged with the rack gear for moving the arm in a linear direction.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the present invention is not limited to the precise arrangements and instrumentalities shown.

In the drawings:

FIG. 3 is an exploded perspective view of a sieve adjustment mechanism in accordance with a preferred embodiment of the present invention;

FIG. 4 is a perspective view of the sieve adjustment mechanism of FIG. 3 in a first position;

FIG. 5 is a perspective view of the sieve adjustment mechanism of FIG. 3 in a second position;

FIG. 9 is an enlarged partial side elevation view of the sieve adjustment mechanism of FIG. 2; and FIG. 10 is an elevation view of a sieve adjustment mechanism in accordance with another aspect of the present invention.

DETAILED DESCRIPTION OF THE INVENTION

Reference will now be made in detail to the preferred embodiments of the invention illustrated in the accompanying drawings. Wherever possible, the same or like reference numbers will be used throughout the drawings to refer to the same or the like features. It should be noted that the drawings are in simplified form and are not drawn to precise scale. In reference to the disclosure herein, for proposes of convenience and clarity only, directional terms such as top, bottom, above, below, and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

The terms "grain," "tailing," and "crop material" are used throughout the specification for convenience and it should be understood that these terms are not intended to be limiting. Thus, "grain" refers to that part of a crop which is harvested and separated from discardable portions of crop material.

Figure 1:
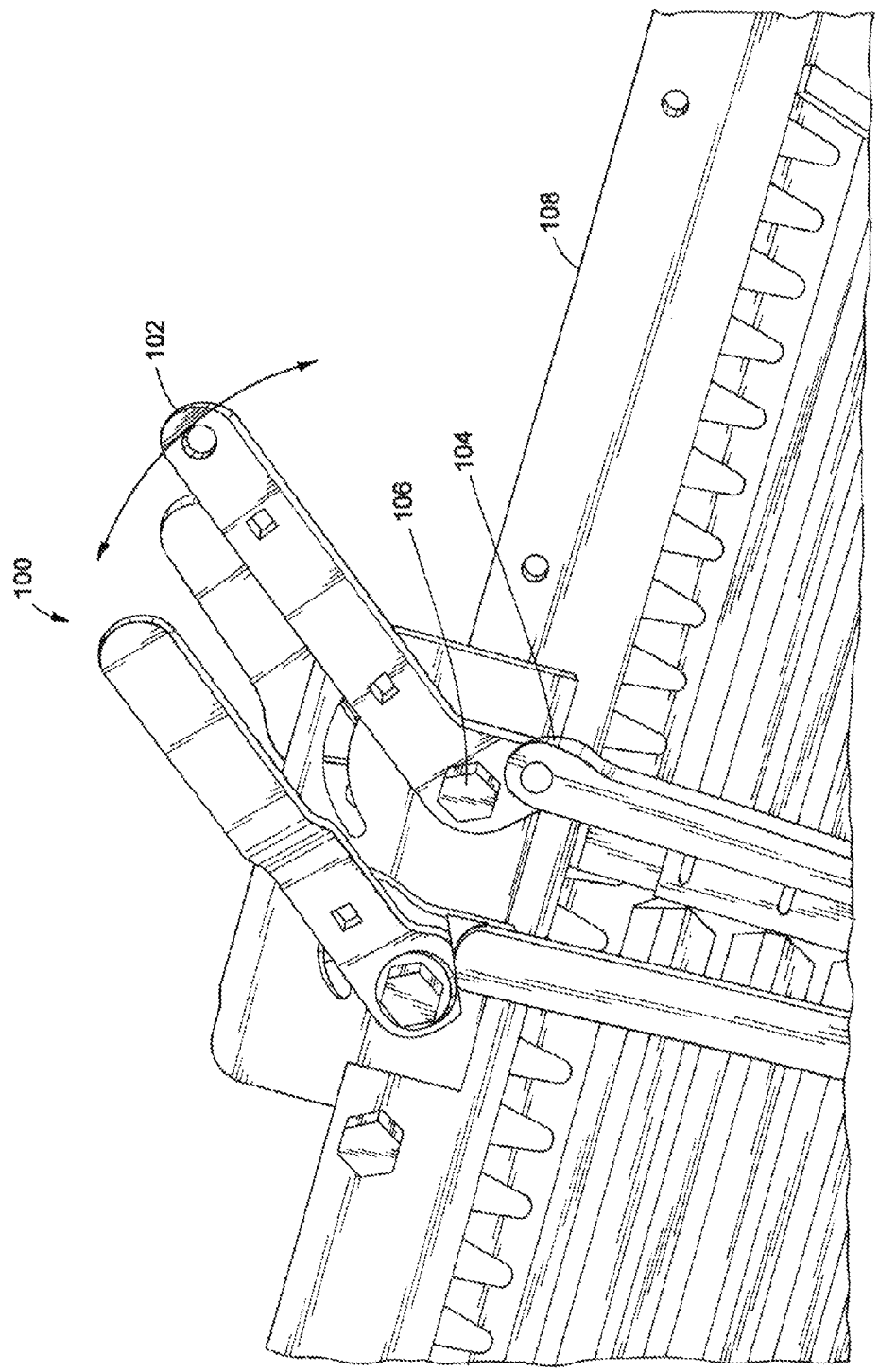
FIG. 1 is a bottom perspective view of a conventional sieve and sieve adjustment mechanism for an agricultural combine.
Figure 2:
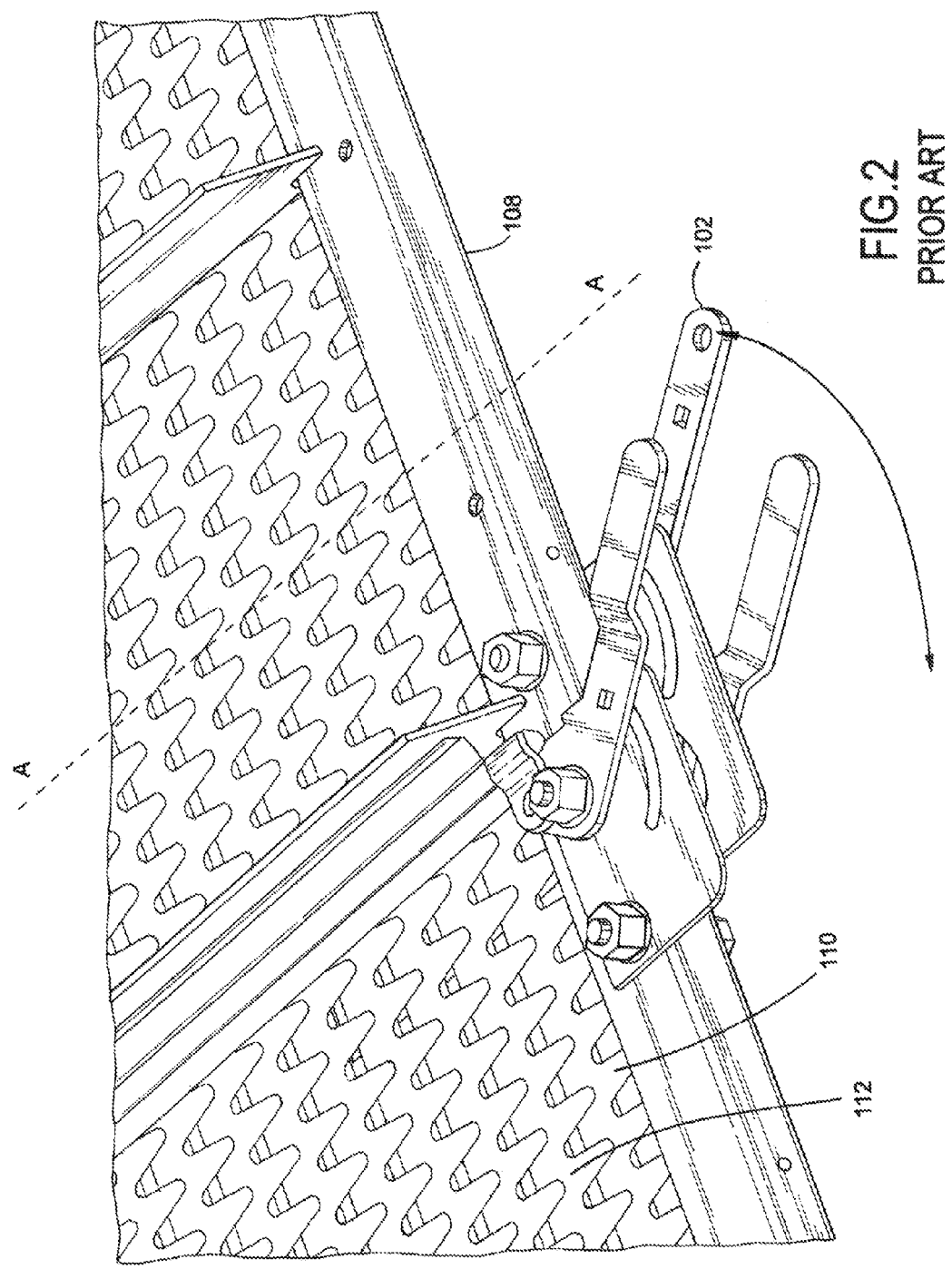
FIG. 2 is a top perspective view of the conventional sieve and sieve adjustment mechanism of FIG. 1.

Referring to FIGS. 3-9, in accordance with a preferred embodiment, the present invention provides a sieve adjustment mechanism 10 for a sieve 108, such as a sieve for an agricultural combine cleaning system (FIG. 2). The sieve adjustment mechanism 10 includes a rack gear 12, a pivot handle 14 and an actuator 160. Collectively, the rack gear 12 and pivot handle 14 is also referred to as a rack and pinion gear mechanism. The sieve 108 can e.g., be a sieve as used in an agricultural combine that includes a first sieve segment 110 disposed adjacent to a second sieve segment 112 in an end to end relation along a first axis A. As used herein, the term "sieve segment" refers to a slat or louver, or a plurality of slats or louvers connected together. Each slat is composed of a plurality of parallel, longitudinally spaced upward and downwardly inclined fingers. The fingers of adjacent ones of the slats defining sieve openings therebetween for the passage of crop material of a desired maximum size therethrough, i.e., clean grain. Slats are simultaneously pivotable about respective pivotal axes through a range of pivotable positions for varying the opening size of the sieve in the well known conventional manner. Alternatively, the slats can be moved in a linear direction to vary the opening size of the sieve. Further details regarding the structure and operation of conventional slats and louvers of sieves applicable to the present invention are disclosed in U.S. Pat. No. 7,371,162, the entire disclosure of which is hereby incorporated by reference herein.

Figure 6:
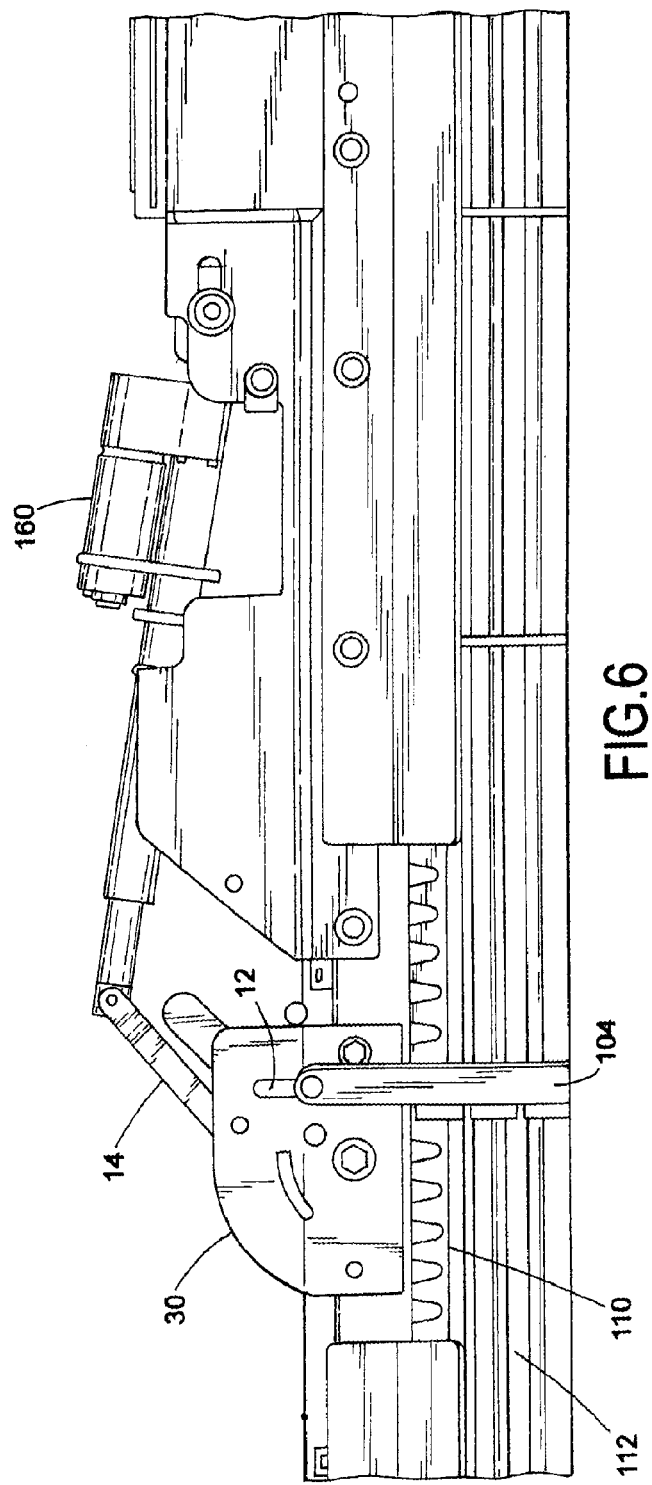
FIG. 6 is an elevation view of the sieve adjustment mechanism of FIG. 3 assembled to a sieve.

The rack gear 12 is movable between a first position (FIG. 4) and a second position (FIG. 5). Referring to FIG. 6, the rack gear 12 is directly connected to one of the first or second sieve segments 110, 112 for moving one of the first and second sieve segments 110, 112 relative to the other to adjust the size of a sieve opening of the sieve 108. The rack gear 12 is directly connected to one of the first or second sieve segments 110, 112 via arm 104. The arm 104 extends along a length of the sieve 108 in a direction substantially parallel to axis A and connects to each sieve segment of the sieve 108 for pivotably (or translationally) moving the sieve segments.

For purposes of convenience only, the present embodiment will hereinafter be described with the rack gear 12 being connected to the first sieve segment or slat 110 of the sieve 108. In particular, the rack gear 12 is rigidly connected to the first sieve segment 110 or arm 104 without any pivot joints. As such, the rack gear 12 provides direct translational motion to the first sieve segment 110 without any lost motion due to variances inherent in pivot joints or linkage systems.

In the first position, the first sieve segment 110 is at a first position that e.g., represents a smallest size opening for the sieve 108. In the second position, the first sieve segment 110 is at a second position that e.g., represents a largest size opening for the sieve 108. However, the rack gear 12 is configured to be movable and positionable throughout a range of motion corresponding to a range or plurality of positions and consequently a plurality of sieve size openings.

The rack gear 12 is configured as a linear gear bar, as best shown in FIG. 3, and includes teeth 16. The teeth 16 are configured to operatively engage the pivot handle 14. The rack gear 12 has a first end 12a and a second end 12b that is opposite the first end 12a. About the second end 12b is a through hole 18 used for connecting the rack gear 12 to the first sieve segment 112 or arm 104. The through hole 18 preferably extends in a direction perpendicular to a longitudinal axis of the rack gear 12. The overall longitudinal length of the rack gear 12 is sized sufficiently to translate the first sieve segment 110 through a range of motion relative to a second sieve segment 112 in order to provide the necessary or desired size opening for the sieve 108.

The pivot handle 14 is configured, as best shown in FIG. 3. The pivot handle 14 is an elongated handle that includes a pinion gear 20 attached to a first end 14a of the pivot handle 14. Preferably, the pinion gear 20 is integrally formed with the pivot handle 14. The pinion gear 20 is also preferably configured as a partial pinion gear. That is, the pinion gear 20 includes teeth 22 covering about ⅓ to about ⅔ of a circumference of the pinion gear 20. More preferably, the teeth 22 cover about ½ of a circumference of the pinion gear 20. The teeth 22 are configured to correspondingly engage teeth 16 on the rack gear 12. A central through hole 26 extends through the pinion gear 20 in a direction coaxial with a central longitudinal axis B of the pinion gear 20. The central through hole 26 is sized to receive a pivot axis 28 that extends therethrough for pivotably mounting the pivot handle 24 on a support 30, as further described below.

In sum, the pinion gear includes a first end for operatively engaging a rack gear for moving the rack gear between first and second positions and a second end opposite the first end. Thus, in operation, the pinion gear 20 pivots about axis B which is coaxial with the central through hole 26.

A handle 24 of the pivot handle 14 extends from the pinion gear 20, as shown in FIG. 3. In other words, the handle 24 extends from the pinion gear 20 in a direction transverse to the central longitudinal axis B of the pinion gear 20.

About a second end 14b of the pivot handle 14, which is opposite the first end 14a, is a "U" shaped bracket 32. The bracket 32 includes a through hole 34 that extends through both ends of the "U" shaped bracket 32. The "U" shaped bracket 32 pivotably connects the pivot handle 14 to the actuator 160, as shown in FIG. 6.

Figure 7:
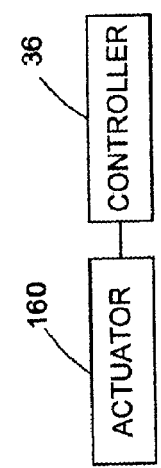
FIG. 7 is a schematic diagram of the sieve adjustment mechanism of the present invention.

The actuator 160 can be any actuator known in the art, such as a hydraulic actuator, and electric actuator and the like. The actuator 160 is operatively connected to and in communication with a controller 36 (FIG. 7). The controller 36 can be any computer, logic control system, or the like, including the onboard controls of e.g., an agricultural combine. The actuator 160 is mounted to the sieve 108 and connected to the second end 14b of the pivot handle 14 to pivot the pivot handle 14 about the pivot axis 28. In other words, the pivot handle 14 pivots about the axis B.

Figure 8:
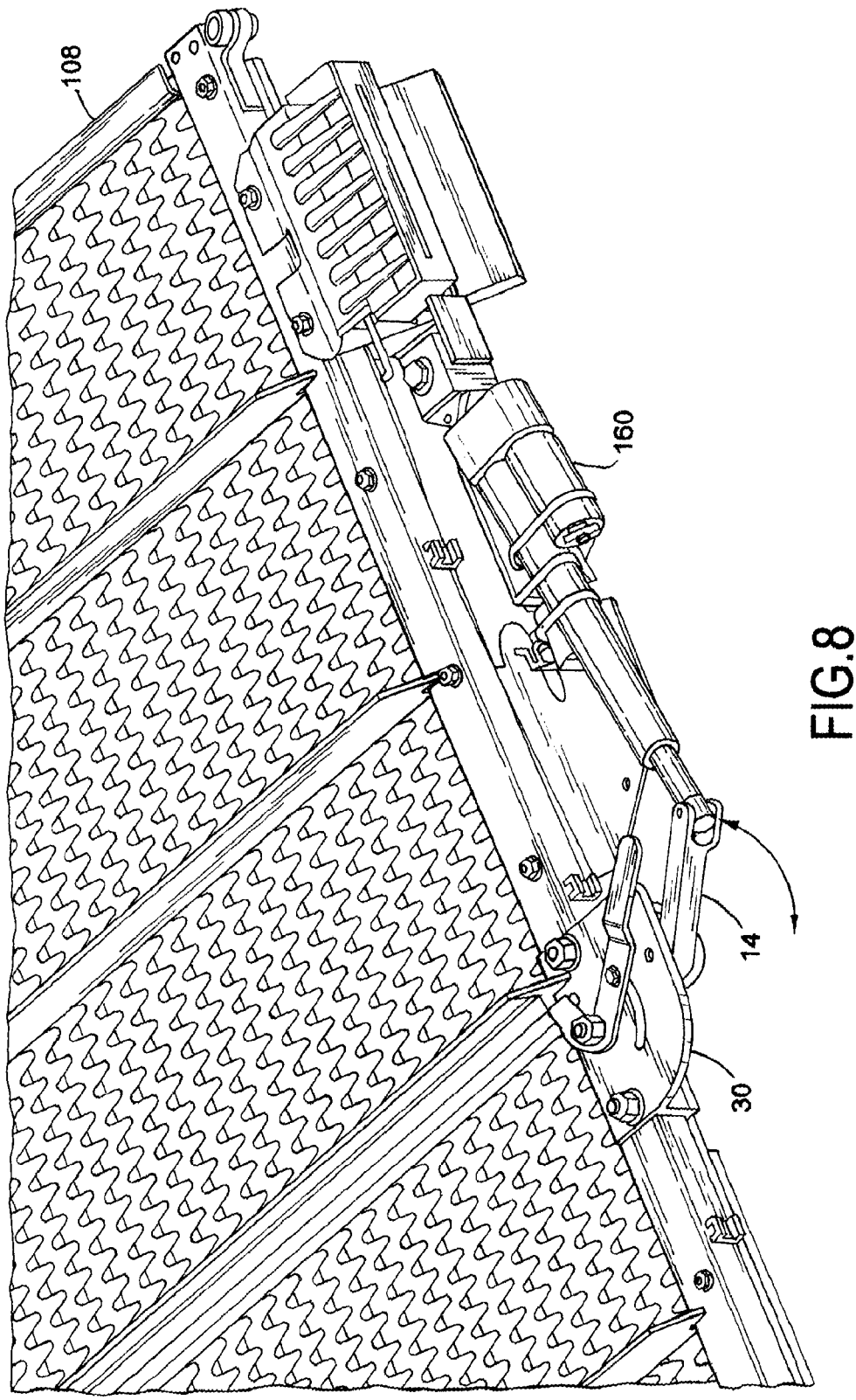
FIG. 8 is a top perspective view of the sieve adjustment mechanism of FIG. 3 assembled to a sieve.

FIGS. 4 and 5 illustrate the sieve adjustment mechanism 10 assembled to the support 30. The support 30 is configured, as best shown in FIGS. 3-5, and includes a mounting bracket end 36 for mounting to the sieve 108, as shown in FIG. 8. The mounting bracket end 36 includes an aperture 38 (FIG. 6) sized to allow for the passage of the rack gear 12 therethrough.

Opposite the mounting bracket end 36 is a sieve adjustment mechanism mounting end 40 which the sieve adjust mechanism 10 mounts to. The sieve adjustment mechanism mounting end 40 is configured as a track 42 that extends in a direction towards the first sieve segment 110 or arm 104 when the support 30 is mounted to the sieve 108. Preferably, the track 42 extends in a direction substantially parallel to longitudinal axis A.

The track 42 includes opposing side walls 44a, 44b and a lateral wall 44c. The lateral wall 44c serves as a guiding surface about which a surface of the rack gear 12, opposite the surface of the rack gear 12 that includes teeth 16, slidingly engages. The opposing side walls 44a, 44b include a through hole 46 that extends through both side walls 44a, 44b and which is configured to receive the pivot axis 28. The through hole 46 is spaced from the lateral wall 44c a distance such that the pinion gear 20 operatively engages the rack gear 16 when assembled on the sieve adjustment mechanism mounting end 40.

In operation, the sieve adjustment mechanism 10 is used to adjust the size of the openings of the sieve 110 about a plurality of size openings by adjusting the position of a first sieve segment 110 relative to a second sieve segment 112. This is accomplished by direct linear translation of the first sieve segment 110 as a result of the direct connection of the rack gear 12 to the first sieve segment 110 and without any intervening linkages or pivot means. In other words, linear translation of the rack gear 12 moves at least one of the first and second sieve segments 110, 112 relative to the other to adjust the size of a sieve opening of the sieve. Referring to FIGS. 4 and 6, when the sieve adjustment mechanism 10 is in the first position, the first sieve segment 110 is in a first position that reflects a minimized sieve opening size. However, when the pivot handle 14 of the sieve adjustment mechanism 10 is pivoted to the second position (FIG. 5) by the actuator 160, the first sieve segment 110 is moved to the second position which reflects a maximum sieve opening size. Intermediate sized openings of the sieve 108 can be effectuated by positioning the pivot handle 14 between the first and second positions.

In sum, owing to the direct linear translation of the rack gear 12 without the necessity of any linkage or pivoting linkages, the present invention advantageously provides for a more accurately controllable sieve adjustments means for controlling and adjusting the size of openings on a sieve. That is, the rack and pinion gear mechanism of the present invention has significantly less lost motion or play due to the nature and tolerances of the meshing gears of the rack and pinion gear mechanism. Further, the rack and pinion gear mechanism of the present invention provides for true straight line motion which is a preferred path of travel for slats/louvers to move between open and closed positions. Consequently, the sieve adjustment mechanism of the present invention provides a more robust mechanism compared to conventional sieve adjustment mechanisms and one that is less prone to deterioration in function over time due to the simple and robust design of the rack gear and pivot handle having a pinion gear of the present invention.

Another advantage of the present invention is that it can be used to replace existing pivoting handle assemblies of a conventional sieve adjustment assembly. That is, the sieve adjustment mechanism 10 can be coupled to an existing arm 104 of conventional sieves.

In accordance with another aspect, instead of a separate rack gear 12 and arm 104 that connects to the sieve segments of a sieve, a rack gear 12' can be formed, and preferably integrally formed, as part of the arm 104' that extends to the support 30 for engagement with the pinion gear 20, as shown in FIG. 10. As such, an additional linkage between the rack gear 12' and the arm 104', along with its play and lost motion, can be eliminated.

In other words, the arm 104' extends between and operatively connects e.g., first and second sieve segments, as discussed in the above embodiment, for moving at least one of the first and second sieve segments relative to the other to adjust the size of a sieve opening of the sieve. Preferably, the arm 104' is configured to move in a linear direction to effectuate movement of the first and second sieve segments relative to each other. More preferably, the arm 104' is connected to at least one of the first and second sieve segments so as to be substantially transverse to a longitudinal axis of the first and/or second sieve segments. The arm 104' includes the rack gear 12' formed at an end of the arm 104' and preferably integrally formed at the end of the arm 104'. The end of the arm 104' having the rack gear 12' extends further past the plurality of sieve segments of the sieve so as to reach and engage a sieve adjustment mechanism 10'.

The sieve adjustment mechanism 10' includes a pinion gear 20 that operatively connects to the rack gear 12' for moving the arm 104' in a linear direction. The sieve adjustment mechanism 10' operatively engages with the rack gear 12' of the arm 104' for moving at least one of the first and second sieve segments relative to the other. The pinion gear 20 preferably includes an integrally formed elongated handle 14.

The sieve adjustment mechanism 10' also includes an actuator 160 connected to the pinion gear 20 for pivoting the pinion gear 20 about a first axis. Thus, in operation, the actuator 160 is preferably assembled to the pinion gear 20 and configured to move in a direction substantially traverse to the linear direction of travel of the arm 104', as shown in FIG. 10.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description, may be employed in other embodiments without departing from the scope of the invention. Accordingly, the following claims are intended to protect the invention broadly as well as in the specific form shown.

I claim:

1. A sieve adjustment mechanism comprising:
a rack gear movable between a first and a second position and connectable to a sieve segment of a sieve for a sliding movement of the sieve segment in a plane thereof between a first sieve position and a second sieve position, the sliding movement in the plane of the sieve for an adjustment of a sieve size;
a pivot handle having a pinion gear at a first end of the pivot handle for operatively engaging the rack gear for moving the rack gear between the first and second positions and a second end opposite the first end, wherein the pinion gear is rotatable about a first axis; and
an actuator connected to the second end for pivoting the pivot handle about the first axis to move the rack gear between the first and second positions, actuation of the actuator induces a force along a single direction on the rack gear via a pivot, the single direction mitigates a lost motion in the pivot during the adjustment of the sieve size, the single direction parallel to a length of the rack gear.

2. The sieve adjustment mechanism of claim 1, wherein the pinion gear is integrally formed with the pivot handle.

3. The sieve adjustment mechanism of claim 1, wherein the pinion gear includes gears circumscribing about ⅓ to about ⅔ of a circumference of the pinion gear.

4. The sieve adjustment mechanism of claim 1, wherein the actuator is pivotally connected to the second end of the pivot handle.

5. The sieve adjustment mechanism of claim 1, wherein the actuator is operatively in communication with a controller.

6. A cleaning system for an agricultural combine comprising:
- a sieve that includes a first sieve segment disposed adjacent a second sieve segment; and
- a sieve adjustment mechanism operatively connected to at least one of the first and second sieve segments for moving at least one of the first and second sieve segments relative to the other to adjust the size of a sieve opening of the sieve, the sieve adjustment mechanism including a rack and pinion gear mechanism for linearly moving at least one of the first and second sieve segments relative to the other, wherein the rack and pinion gear mechanism includes a pinion gear integrally formed with an elongated handle; and
- a pivot assembly operatively connected to the pinion gear mechanism for translation of a rotation induced on the pivot assembly to a force, the force operates in a single direction on the rack, the single direction mitigates a play of the pivot assembly during an adjustment of the sieve size via a sliding movement in a plane of the sieve, the single direction parallel to a length of the rack.

7. The cleaning system of claim 6, wherein the pinion gear includes a first end for operatively engaging a rack gear for moving the rack gear between first and second positions and a second end opposite the first end, and wherein the pinion gear pivots about a first axis.

8. The cleaning system of claim 6, wherein the sieve adjustment mechanism further includes an actuator connected to the rack and pinion gear mechanism for pivoting the pinion gear about a first axis.

9. The cleaning system of claim 8, wherein the actuator is pivotally connected to the rack and pinion gear mechanism.

10. The cleaning system of claim 8, wherein the actuator is operatively in communication with a controller.

11. The cleaning system of claim 6, wherein at least one of the first and second sieve segments is connected to a rack gear of the rack and pinion gear mechanism.

12. The cleaning system of claim 11, wherein linear translation of the rack gear moves at least one of the first and second sieve segments relative to the other to adjust the size of a sieve opening of the sieve.

13. The cleaning system of claim 6, wherein the pinion gear includes gears circumscribing about ⅓ to about ⅔ of a circumference of the pinion gear.

14. The cleaning system of claim 6, wherein the pinion gear includes gears circumscribing about ½ of a circumference of the pinion gear.

15. A sieve assembly comprising:
- a sieve that includes a first sieve segment disposed adjacent a second sieve segment;
- an arm extending between and operatively connecting the first and second sieve segments, the arm including a rack gear integrally formed at an end of the arm;
- a sieve adjustment mechanism operatively connected to the arm for moving at least one of the first and second sieve segments relative to the other to adjust the size of a sieve opening of the sieve via a sliding motion in a plane thereof, the sieve adjustment mechanism including a pinion gear operatively engaged with the rack gear for moving the arm in a linear direction; and
- an actuator that induces a force along a single direction on the rack gear via a pivot, the single direction mitigates a lost motion in the pivot during an adjustment by the sieve adjustment mechanism, the single direction parallel to a length of the rack gear.

16. The sieve assembly of claim 15, wherein the pinion gear includes an integrally formed elongated handle.

17. The sieve assembly of claim 15, wherein the actuator is connected to the pinion gear for pivoting the pinion gear about a first axis.

18. The sieve assembly of claim 17, wherein the actuator is operatively in communication with a controller.

19. The sieve assembly of claim 17, wherein the actuator is configured to move in a direction substantially transverse to the linear direction.

20. The sieve assembly of claim 15, wherein the pinion gear includes gears circumscribing about ⅓ to about ⅔ of a circumference of the pinion gear.

* * * * *